(12) United States Patent
Healy et al.

(10) Patent No.: US 10,304,141 B1
(45) Date of Patent: *May 28, 2019

(54) INSURANCE POLICY MANAGEMENT USING TELEMATICS

(71) Applicant: United Services Automobile Association (USAA), San Antonio, TX (US)

(72) Inventors: Jodi Jean Healy, Johns Creek, GA (US); Keith Rodgers, Scottsdale, AZ (US); Rod Gonzales, San Antonio, TX (US); Robert Kenneth Dohner, San Antonio, TX (US); Christine Marie Brown, San Antonio, TX (US); Reynaldo Medina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,459

(22) Filed: Aug. 4, 2017

Related U.S. Application Data

(63) Continuation of application No. 13/936,243, filed on Jul. 8, 2013, now Pat. No. 9,727,920, which is a (Continued)

(51) Int. Cl.
*G06Q 40/00* (2012.01)
*G06Q 40/08* (2012.01)

(52) U.S. Cl.
CPC .................................. *G06Q 40/08* (2013.01)

(58) Field of Classification Search
CPC ......... G06G 40/08; G06G 50/22; G06G 40/00
See application file for complete search history.

(56) References Cited

U.S. PATENT DOCUMENTS 6,175,803 B1 * 1/2001 Chowanic .............. G01C 21/34
340/988
6,278,939 B1 8/2001 Robare et al.
(Continued)

OTHER PUBLICATIONS

Gearing up: insurers are using driver safety programs sharply focused advertising and the Internet to court teen drivers, Goch, Lynna. Best's Review104.6: 20(12). A.M. Best Company, Inc. (Oct. 2003).*

(Continued)

*Primary Examiner* — Lalita M Hamilton
(74) *Attorney, Agent, or Firm* — Baker & Hostetler LLP

(57) ABSTRACT

A method or system may comprise generating a plurality of routes to a destination of a vehicle. Traversal, by the vehicle, of a route may be determined by a telematics device. The telematics vehicle may be configured to monitor a location of the vehicle and motion of the vehicle. The telematics device may be configured to generate data associated with the traversal of the route, the location of the vehicle, or the motion of the vehicle. Driving behavior of the vehicle may be determined, based at least on the data. A rating associated with the vehicle or the traversal of the route may be determined, based at least on the driving behavior. A risk score may be determined for the route. The rating may be determined, based at least on the risk score. The rating may be determined, based at least on the driving behavior.

19 Claims, 12 Drawing Sheets

Related U.S. Application Data continuation of application No. 13/670,328, filed on Nov. 6, 2012, now Pat. No. 8,788,299, and a continuation of application No. 12/404,554, filed on Mar. 16, 2009, now Pat. No. 9,332,242.

(56) References Cited

U.S. PATENT DOCUMENTS

| | | |
|---|---|---|
| 2005/0256638 A1 | 11/2005 | Takahashi et al. |
| 2007/0027726 A1* | 2/2007 | Warren ................ G06Q 40/08 705/4 |
| 2007/0061155 A1 | 3/2007 | Ji et al. |
| 2007/0282638 A1 | 12/2007 | Surovy |
| 2008/0071465 A1 | 3/2008 | Chapman et al. |
| 2009/0132294 A1 | 5/2009 | Haines |
| 2010/0131301 A1 | 5/2010 | Collopy et al. |

OTHER PUBLICATIONS

Daunoras, Jonas et al: "City Transport Monitoring and Routes Optimal Management System", Dept. of Control Technology, Kaunas University of Technology, Oct. 1, 2007, pp. 144-149.

* cited by examiner

INSURANCE POLICY MANAGEMENT USING TELEMATICS

CROSS REFERENCE TO RELATED APPLICATIONS

This application claims continuation-in-part priority to U.S. patent application Ser. No. 13/936,243 filed Jul. 8, 2013, which claims continuation priority to U.S. patent application Ser. No. 13/670,328 filed Nov. 6, 2012, which claims continuation priority to U.S. patent application Ser. No. 12/404,554 filed Mar. 16, 2009 which are incorporated herein by reference in their entirety.

FIELD OF THE INVENTION

The disclosed embodiments generally relates to the field of computers and similar technologies, and more particularly, to a system, method, and computer-usable medium for providing routing-based insurance.

BACKGROUND OF THE INVENTION

Current methods of providing insurance are based on statistical analysis of a multitude of risk factors related to a wide variety of personal and demographic information associated with an insured. While these methods have become more sophisticated over time, they still have their limitations. As an example, the cost of an automobile insurance policy is often based on the age and sex of the insured, their primary geographic location, as well as the class of their vehicle. Other factors, such as the number of miles the insured drives in a year, and the ratio of business to personal miles driven, is increasingly being taken into consideration. All of these risk factors are then typically compared to the accident incidence and claim rates of a pool of drivers that are the same sex and age group, drive the same class of vehicle, live in the same geographical area, and drive a similar number of miles every year. These comparisons generally provide useful information related to the frequency, and cost, of claims made by members of the insured pool. However, these approaches remain generalized and are not oriented to the travel behavior of a specific insured or insured vehicle.

For example, three individual insureds may drive the same type of vehicle, live in the same neighborhood, and have final destinations that are in close proximity to one another. Yet the first driver may typically take a route through neighborhoods with high crime rates in order to save transit time. The second driver, also hoping to save transit time, may prefer taking a highway route that avoids high crime areas but has a high percentage of rush hour traffic accidents. The third driver, being more cautious, may elect to take a slower, yet safer route. Despite the respective risk of each route, all three drivers may pay the same auto insurance premium for the same amount of coverage.

The use of telematics in automobiles has become more common in recent years, particularly as implemented with in-car navigation systems. Based upon provision of a current location and a desired destination, these systems typically provide an optimum route between two points. However, this routing is typically oriented towards the shortest route, which may not be the safest or the quickest. In recent years, real-time information feeds from satellite imaging, traffic control, law enforcement, and weather forecasting systems have become more available and suitable for integration. Current approaches are known for processing information from these and other sources to provide multiple routes, each with a corresponding risk index, between two points. In some cases, these routes may comprise a multitude of route segments, each with a corresponding risk index, which are used to provide a composite risk index for a route. The individual risk index for each segment, or the composite risk index for each route, is usually displayed within the user interface of a navigation system. The user then selects the route that most closely matches their individual tolerance for risk. However, insurance providers currently have no way of determining which route, or route segment, a driver may take or what driving behavior they exhibit along the route. Furthermore, insurance providers lack the information to either lower the cost of an automobile insurance policy in response to a driver selecting a route with a low risk index or driving safely, or alternatively, raise the cost of the policy for electing to follow a route with a high risk index or driving aggressively.

SUMMARY OF THE INVENTION

A method or system may comprise determining, by a telematics device of a vehicle, traversal, by the vehicle, of a route. The telematics vehicle may be configured to monitor a location of the vehicle. The telematics device may be configured to generate data associated with the traversal of the route. Driving behavior of the vehicle may be determined, such as based at least on the data. A rating associated with the traversal of the route may be determined, such as based at least on the driving behavior.

A method or system may comprise receiving, from a telematics device of a vehicle, data generated by the telematics device. The telematics device may be configured to monitor movement of the vehicle. The data may be associated with movement of the vehicle. Driving behavior associated with the vehicle may be determined, based at least on the data. A rating associated with the vehicle may be determined, based at least on the driving behavior.

A method or system may comprise generating a plurality of routes to a destination of a vehicle. Each of the plurality of routes may comprise or more segments. A risk score may be determined for each of the plurality of routes, based at least on the one or more route segments. The vehicle may be monitored by a telematics device. The vehicle may be monitored on the selected route. A rating associated with traversal of the selected route may be determined, based on least on the risk score of the selected route. The rating may be determined based at least on the monitoring the vehicle on the selected route.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
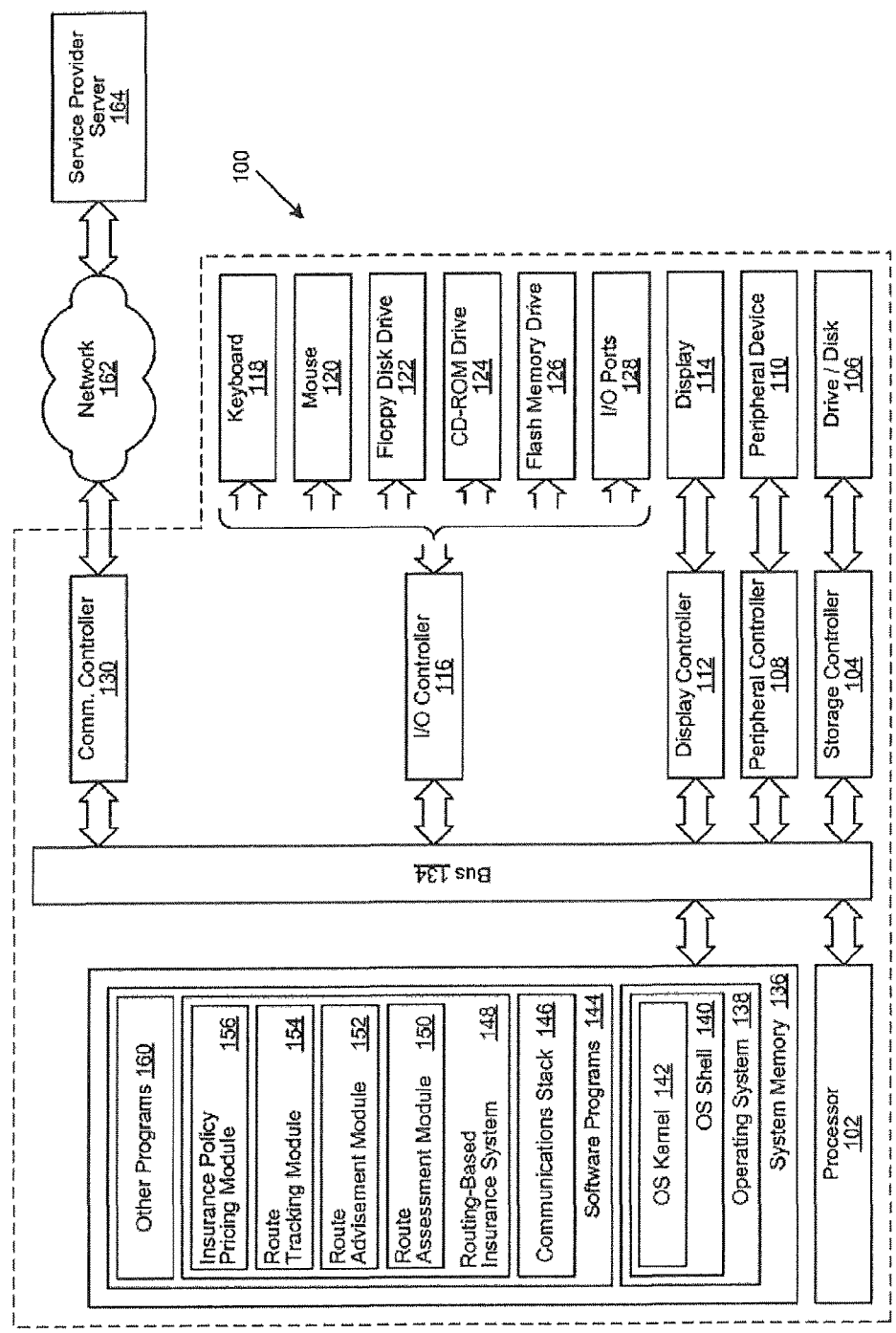
FIG. 1 depicts an exemplary client information processing system (IPS) in which embodiments of the disclosure may be implemented.

A system, method, and computer-usable medium are disclosed for managing an insurance policy using telematics.

As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to one or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146 and other programs 160. The communications stack 146 is operable to implement any communication protocol enabling various embodiments of the disclosure. Software programs 144 also include a routing-based insurance system 148, which comprises a route assessment module 150, a route advisement module 152, a route tracking module 154, and an insurance policy pricing module 156. The routing-based insurance system 148 includes computer executable instructions for implementing the processes described in FIGS. 2-6 described herein below. In one embodiment, client IPS 100 is able to download the computer executable instructions of the routing-based insurance system 148 from a service provider server 164 located at a remote location. In another embodiment, the computer executable instructions of the routing-based insurance system 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
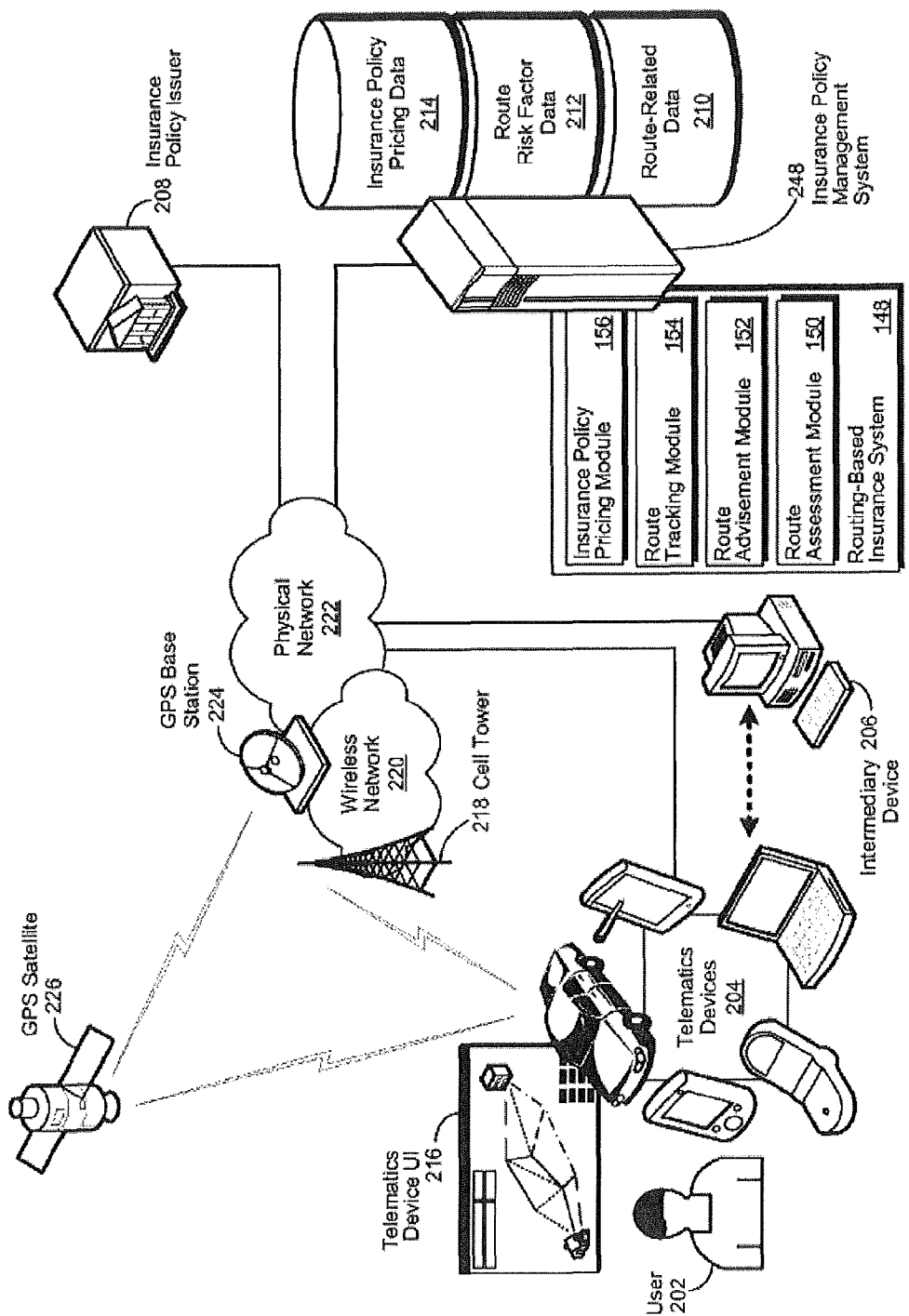
FIG. 2 is a simplified block diagram of a routing-based insurance system as implemented in accordance with an embodiment of the disclosure.

FIG. 2 is a simplified block diagram of a routing-based insurance system as implemented in accordance with an embodiment of the disclosure. In various embodiments, a routing-based insurance system 148 is implemented with an insurance policy management system 248 for the provision of routing-based insurance to a user 202. In these and other embodiments, the insurance policy management system comprises the routing-based insurance system 148, a repository of route-related data 210, a repository of route risk factor data 212, and a repository of insurance policy pricing data 214. The routing-based insurance system 148 further comprises a route assessment module 150, a route advisement module 152, a route tracking module 154, and an insurance policy pricing module 156.

In various embodiments, a telematics device 204 exchanges information in near real-time, or non-real-time, directly or indirectly, through one or more networks 220, 222 and intermediary devices 206, with the routing-based insurance system 148. As used herein, telematics broadly refers to the integrated use of telecommunications and informatics. More specifically, telematics refers to the receiving, storing, processing and sending of information via telecommunication devices, such as the telematics devices 204. As likewise used herein, a device used in a telematics system may comprise an On Board Device (OBD) which preferably connects to a vehicles Engine Control Unit (ECU), a smart phone device, a laptop computer, a tablet computer, a personal digital assistant (PDA), a mobile telephone, or any device operable to receive, process, store, and transmit information. Likewise, a telematics system device may also comprise a navigation device or a geographic positioning system (GPS), such as embodied in a GPS satellite 226 and a GPS base station 224 attached to a physical network 222 or wireless network 220.

Skilled practitioners of the art will be aware that the use of telematics has more recently been related to the integration of GPS technology with computers and mobile communications technology in automotive navigation systems. When used in such systems, telematics is more commonly referred to as vehicle telematics. One application of vehicle telematics is to monitor the location and movement of a vehicle. This monitoring is commonly achieved through a combination of a GPS receiver and a transmitting device, such as a Global System for Mobile communication (GSM) General Packet Radio Service (GPRS) modem or a Short Message Service (SMS) transmitter. In these and other embodiments, a vehicle may comprise any method of transportation, including but not limited to, an automobile, a motorcycle, a bicycle, an aircraft, or an aquatic vessel. In one embodiment, the telematics device 204 is not implemented with a vehicle. Instead, the telematics device is implemented for use by a user 202 traversing a route on foot. In this embodiment, the movement of the user 202 along a route is monitored by the telematics device 204.

In various embodiments, data related to the user's 202 traversal of a route is provided by the telematics device 204 to the routing-based insurance system 148. In one embodiment, the data is provided by the telematics device 204 directly to the routing-base insurance system 148 through a wireless connection to a cell tower 218 of the wireless network 220, which is likewise connected to physical network 222. In another embodiment, the data is provided by the telematics device 204 directly to the routing-base insurance system 148 through a connection to the physical network 222. In yet another embodiment, the data is indirectly provided by the telematics device 204 to the routing-base insurance system 148 through an intermediary device 206, which in turn is connected to the physical network 222. It will be apparent to skilled practitioners of the art that many such embodiments are possible for the receipt, storage, processing, and transmittal of routing-based insurance information by the telematics devices 204, and the foregoing are not intended to limit the spirit, scope or intent of the disclosure.

In various embodiments, the telematics device 204 determines the current location of an insured (e.g., user 202) of a routing-based insurance policy issued by an insurance policy issuer 208. In one embodiment, the current location is determined by using GPS technology, such as that provided by the GPS base station 224 and GPS satellite 226, implemented in a vehicle navigation system. In another embodiment, the current location is automatically determined by the telematics device 204. In yet another embodiment, the current location is provided to the telematics device 204 by the user 202. Once determined, the current location of the user 202 is submitted to the routing-based insurance system 148, directly or indirectly, by the telematics device 204.

In one embodiment, the user 202 knows their destination in advance and uses a telematics device 204 to submit the destination location, directly or indirectly, to the routing-based insurance system 148. The routing-based insurance system 148 then processes information related to the current location and the destination location to determine available route segments between the two locations. In one embodiment, the information related to the current location and the destination location is stored in a repository of route-related data 210. In another embodiment, the user 202 may not have a specific destination in mind. If that is the case, then available route segments originating from the current location are determined.

Once the route segments have been determined, a set of risk score data is generated for each of the available route segments. In various embodiments, the set of risk score data is generated from a plurality of risk factor data associated with each route segment. As used herein, risk factor data refers to data that can be used to characterize one or more risk factors for a route segment. In one embodiment, the risk factor data related to a route segment is stored in the repository of route risk factor data 212. In one related to a route segment is stored in the repository of route risk factor data 212. In one embodiment, the set of risk factor score data is generated by the route assessment module 150.

A set of risk score differential data is generated for each of the route segments. In one embodiment, the risk score differential data is generated by the route assessment module 150 performing comparison operations between a first set of risk score data and a second set of risk score data as described in greater detail herein. Information related to each route segment is then retrieved for use as routing instructions. For example, the routing instructions may include information associated with a map. In one embodiment, the information related to each route segment is stored in the repository of route-related data 210. Route advisement data, comprising the routing instructions and the set of risk score differential data for the route segment, is generated. In one embodiment, the route advisement data is generated by the route advisement module 152 of the routing-based insurance system 148. The route advisement data is then provided to the telematics device 204, where it is displayed within the user interface (UI) 216 of the telematics device. Once displayed, a route segment is selected by the user 202 for traversal, followed by the submission of the selected route segment by the telematics device 204 to the routing-based insurance system 148.

The selected route segment is then traversed by the user 202 and route traversal data is generated. In one embodiment, the route traversal data is generated by the route tracking module 154 from data related to the user's 202 traversal of the selected route segment. The set of risk score differential data associated with the traversed route segment is determined and then associated with the insured's insurance policy. Insurance policy price data, corresponding to the traversed route segment, is then generated by processing the route segment's associated set of risk score differential data. In turn, the route traversal data and the insurance policy price data associated with the traversed route segment is processed to generate insurance policy adjustment data. In one embodiment, the insurance policy price data and the insurance policy adjustment data is generated by the insurance policy pricing module 156. The insurance policy price adjustment data is processed by an insurance policy pricing module 156 to modify pricing data associated with the insured's insurance policy.

Figure 3:
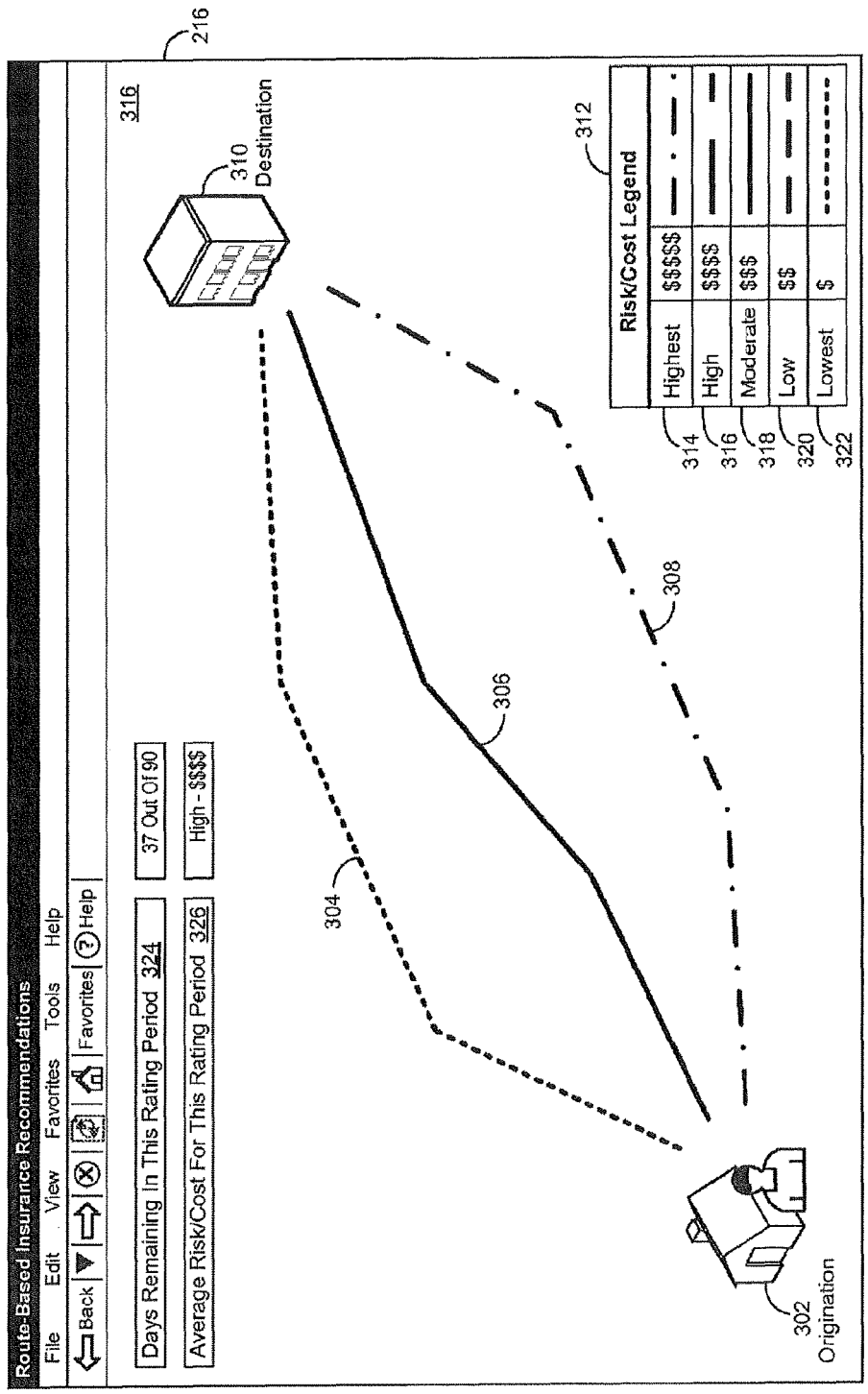
FIG. 3 is a simplified illustration of a routing-based insurance system as implemented within a window of a user interface in accordance with an embodiment of the disclosure for displaying a risk score associated with a route.

FIG. 3 is a simplified illustration of a routing-based insurance system as implemented within a window of a user interface in accordance with an embodiment of the disclosure for displaying a risk score associated with a route. In various embodiments, route advisement data is provided by a routing-based insurance system for display within a window 330 of the user interface 216 of a telematics device, which is described in greater detail herein. As illustrated in FIG. 3, the route advisement data comprises a 'Risk/Cost' legend 312, an origination location 302, a destination location 310, and a plurality of routes 304, 306, 308 connecting the two locations. As likewise illustrated in FIG. 3, the route advisement data also comprises data display fields for the "Days Remaining in This Rating Period" 324 and the "Average Risk/Cost for This Rating Period" 326. The 'Risk/Cost' legend 312 further comprises a plurality of risk and cost information elements. As an example, the first risk and cost information element 314 is shown to have the highest risk, which corresponds to the highest insurance cost, while the last risk and cost information element 322 is shown to have the lowest risk, which corresponds to the lowest insurance cost. As likewise shown in FIG. 3, the remaining risk and cost information elements 316, 318, and 320 respectively have a high, moderate, and low risk, which respectively correspond to a high, moderate, and low insurance cost. In various embodiments, visual attributes are applied to the plurality of routes 304, 306, 308 to indicate their respective risk and corresponding insurance cost. As an example, the uppermost route 304 is associated with the last risk and cost information element 322, indicating that it has the lowest risk and the lowest corresponding insurance cost. Likewise, the middle route 306 is associated with the middle risk and cost information element 318, indicating that it has moderate risk and a corresponding moderate insurance cost. In a like fashion, the lowest most routes 308 is associated with the upper risk and cost information element 314, indicating that it has the highest risk and a corresponding highest insurance cost. It will be apparent to those of skill in the art that many such embodiments are possible.

Figure 4:
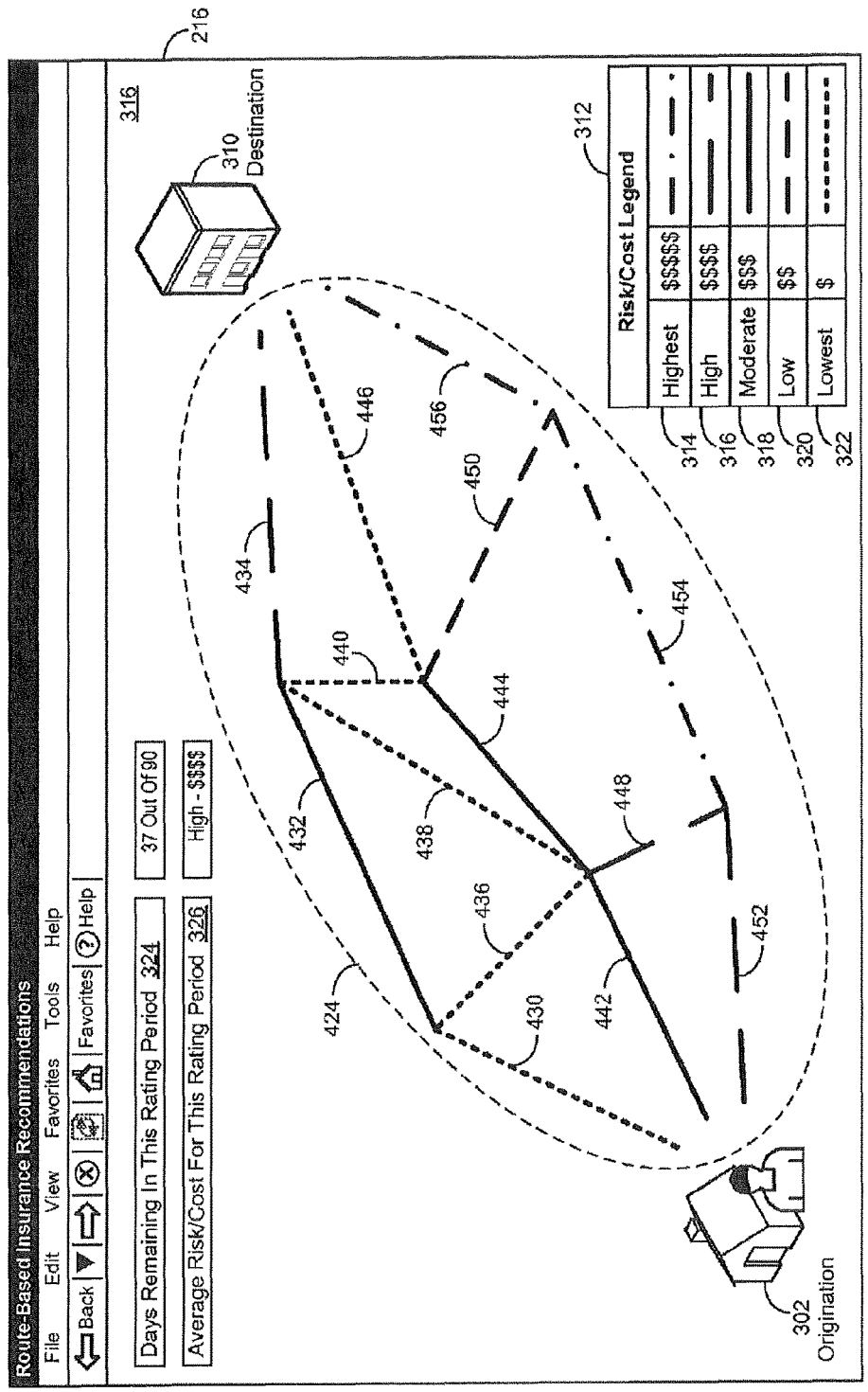
FIG. 4 is a simplified illustration of a routing-based insurance system as implemented within a window of a user interface in accordance with an embodiment of the disclosure for displaying a risk score associated with a route segment.

FIG. 4 is a simplified illustration of a routing-based insurance system as implemented within a window of a user interface in accordance with an embodiment of the disclosure for displaying a risk score associated with a route segment.

In various embodiments, route advisement data is provided by a routing-based insurance system for display within a window 330 of the user interface 216 of a telematics device, which is described in greater detail herein. As illustrated in FIG. 4, the route advisement data comprises a 'Risk/Cost' legend 312, an origination location 302, a destination location 310, and a plurality of route segments 424 connecting the two locations. As likewise illustrated in FIG. 4, the route advisement data also comprises data display fields for the "Days Remaining in This Rating Period" 324 and the "Average Risk/Cost for This Rating Period" 326. The 'Risk/Cost' legend 312 further comprises a plurality of risk and cost information elements. As an example, the first risk and cost information element 314 is shown to have the highest risk, which corresponds to the highest insurance cost, while the last risk and cost information element 322 is shown to have the lowest risk, which corresponds to the lowest insurance cost. As likewise shown in FIG. 3, the remaining risk and cost information elements 316, 318, and 320 respectively have a high, moderate, and low risk, which respectively correspond to a high, moderate, and low insurance cost.

In various embodiments, visual attributes are applied to the plurality of route segments 424 to indicate their respective risk and corresponding insurance cost. As an example, route segments 430, 436, 438, 440, and 446 are associated with the last risk and cost information element 322, indicating that they have the lowest risk and the lowest corresponding insurance cost. Likewise, route segment 450 is associated with the next lowest risk and cost information element 320, indicating that it has low risk and a corresponding low insurance cost. In a like fashion, the route segments 442, 444, and 432 are associated with the middle risk and cost information element 318, indicating that they have a moderate risk and a corresponding moderate insurance cost. Likewise, the route segments 448 and 452 are associated with the next highest risk and cost information element 316, indicating that they have a high risk and a corresponding high insurance cost. As likewise illustrated in FIG. 4, the route segments 454 and 456 are associated with the highest risk and cost information element 314, indicating that they have the highest risk and a corresponding highest insurance cost.

It will be apparent to those of skill in the art that a user can view the route advisement information and make appropriate risk and insurance cost trade-off determinations. As an example, a route comprising route segments 430, 436, 438, 440, and 446 may provide the least risky route with the lowest insurance cost, but at the expense of traveling longer distances, taking longer to arrive at the destination 310, and possibly higher fuel costs. Conversely, a route comprising route segments 452, 454, and 456 may decrease the distance traveled and shorten travel time, but at a higher risk and a corresponding increase in insurance costs. However, a route comprising route segments 442, 444, and 446, would provide moderate travel distance and time along with moderate risk and insurance costs.

Figure 5A:
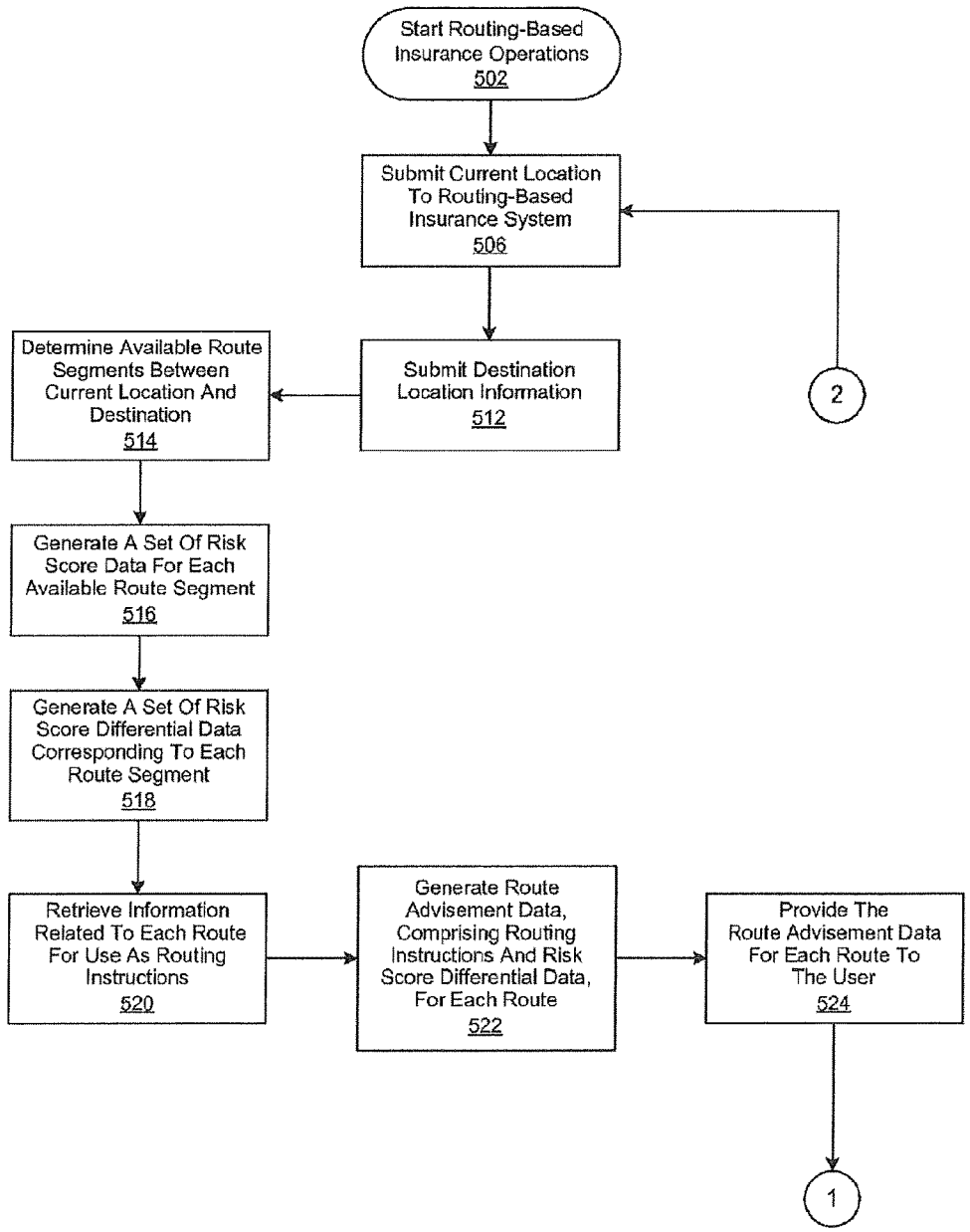
FIGS. 5A and 5B are a generalized flowchart of the operation of a routing-based insurance system as implemented in accordance with an embodiment of the disclosure.
Figure 5B:
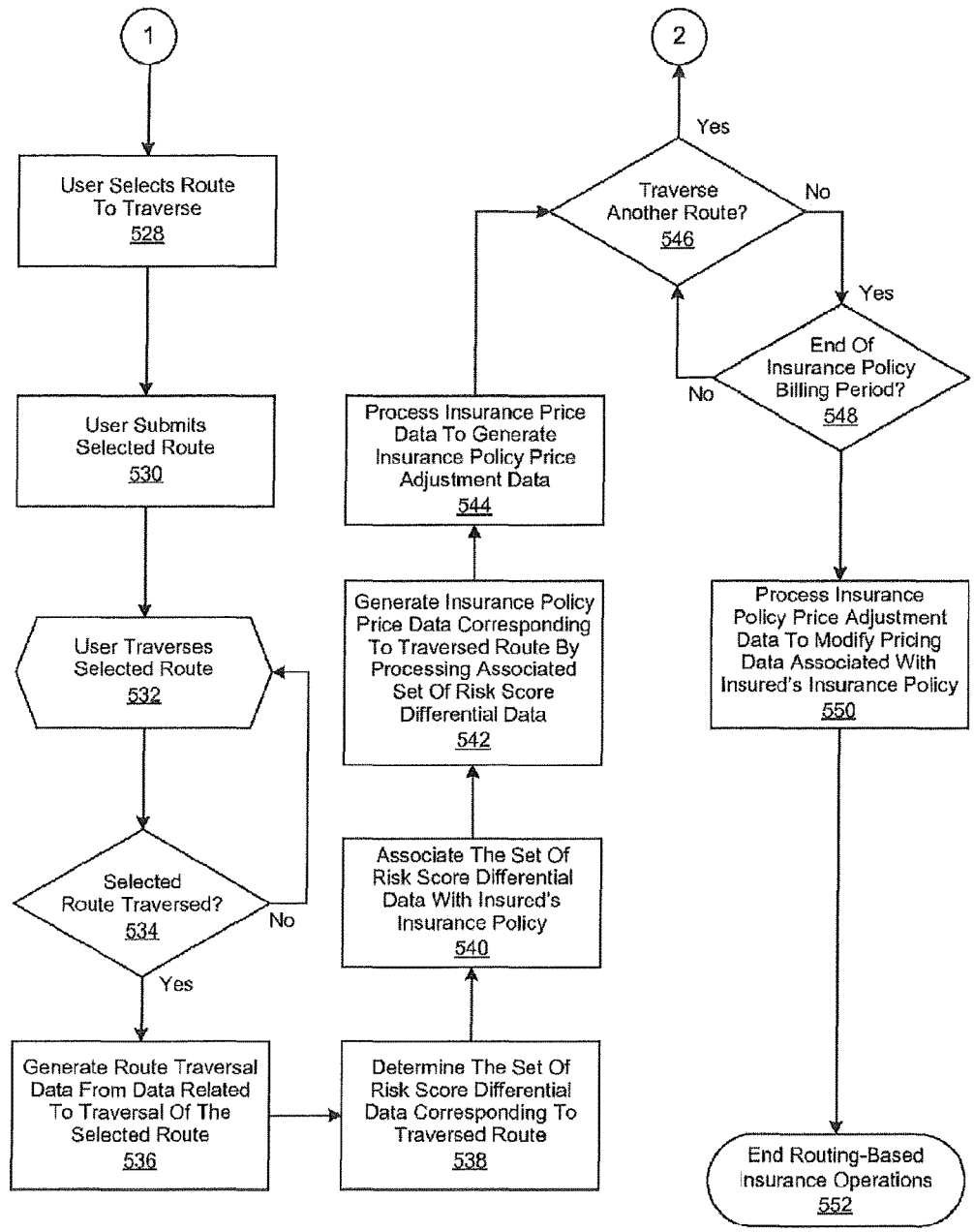

FIGS. 5A and 5B are a generalized flowchart of the operation of a routing-based insurance system as implemented in accordance with an embodiment of the disclosure. In this embodiment, routing-base insurance operations are begun in block 502, followed by the submission of the current location of an insured of a routing-based insurance policy to the routing-based insurance system in block 506. Destination location information is then submitted to the routing-based insurance system in block 512. The routing-based insurance system then processes information related to the current location and the destination location in block 514 to determine available routes between the two locations. In one embodiment, the information related to the current location and the destination location is stored in a repository of route-related data.

A set of risk score data is generated for each of the available routes in block 516. In various embodiments the set of risk score data is generated from a plurality of risk factor data associated with each route. As used herein, risk factor data refers to data that can be used to characterize one or more risk factors for a route. As an example, one risk factor may be crime statistics for an area traversed by the route. As another example, historical accident rates for the route may provide a risk factor. Other examples include road surface conditions, inclement weather, visibility (e.g., driving in the sun (sun glare)), construction activities, traffic conditions, or pending natural disasters. It will be apparent to those of skill in the art that many such risk factors are possible and the foregoing are not intended to limit the spirit, scope, or intent of the disclosure. In one embodiment, the risk factor data related to a route is stored in a repository of route risk factor data. In one embodiment, the set of risk factor score data is generated by a route assessment module.

In block 518, a set of risk score differential data is generated for each of the routes. In one embodiment, the risk score differential data is generated by a route assessment module performing comparison operations between a first set of risk score data and a second set of risk score data as described in greater detail herein. Information related to each route is then retrieved for use as routing instructions in block 520. For example, the routing instructions may include information associated with a map. In one embodiment, the information related each route is stored in a repository of route-related data. Route advisement data, comprising the routing instructions and the set of risk score differential data for the route segment, is generated in block 522. In one embodiment, the route advisement data is generated by a route advisement module of the routing-based insurance system. The route advisement data is then provided to the user in block 524.

A route segment is selected by the user in block 528 to traverse, followed by the submission of the selected route by the user to the routing-based insurance system in block 530.

The selected route is then traversed in block 532, followed by a determination in block 534 whether the selected route has been traversed. If not, the process continues, proceeding with block 532. Otherwise, route traversal data is generated from data related the traversal of the selected route block 536. In one embodiment, the route traversal data is generated from data related to the traversal of the selected route by a route tracking module of the routing-based insurance system. The set of risk score differential data associated with the traversed route is determined in block 538, followed by its association with the insured's insurance policy in block 540.

In block 542, insurance policy price data, corresponding to the traversed route, is generated by processing the route's associated set of risk score differential data. In block 544, the route traversal data and the insurance policy price data associated with the traversed route is processed to generate insurance policy adjustment data. In one embodiment, the insurance policy price data and the insurance policy adjustment data is generated by an insurance policy pricing module of the routing-based insurance system. A determination is then made in block 546 whether to traverse another route. If so, then the process continues, proceeding with block 506. Otherwise, a determination is made in block 548 if an insurance policy price adjustment is available. If not, then the process continues, proceeding with block 546. Otherwise, the insurance policy price adjustment data is processed in block 550 to modify pricing data associated with the insured's insurance policy. In one embodiment, the insurance policy price adjustment data is processed by an insurance policy pricing module of the routing-based insurance system to modify pricing data associated with the insured's insurance policy. Routing-based insurance operations are then ended in block 552.

Figure 6A:
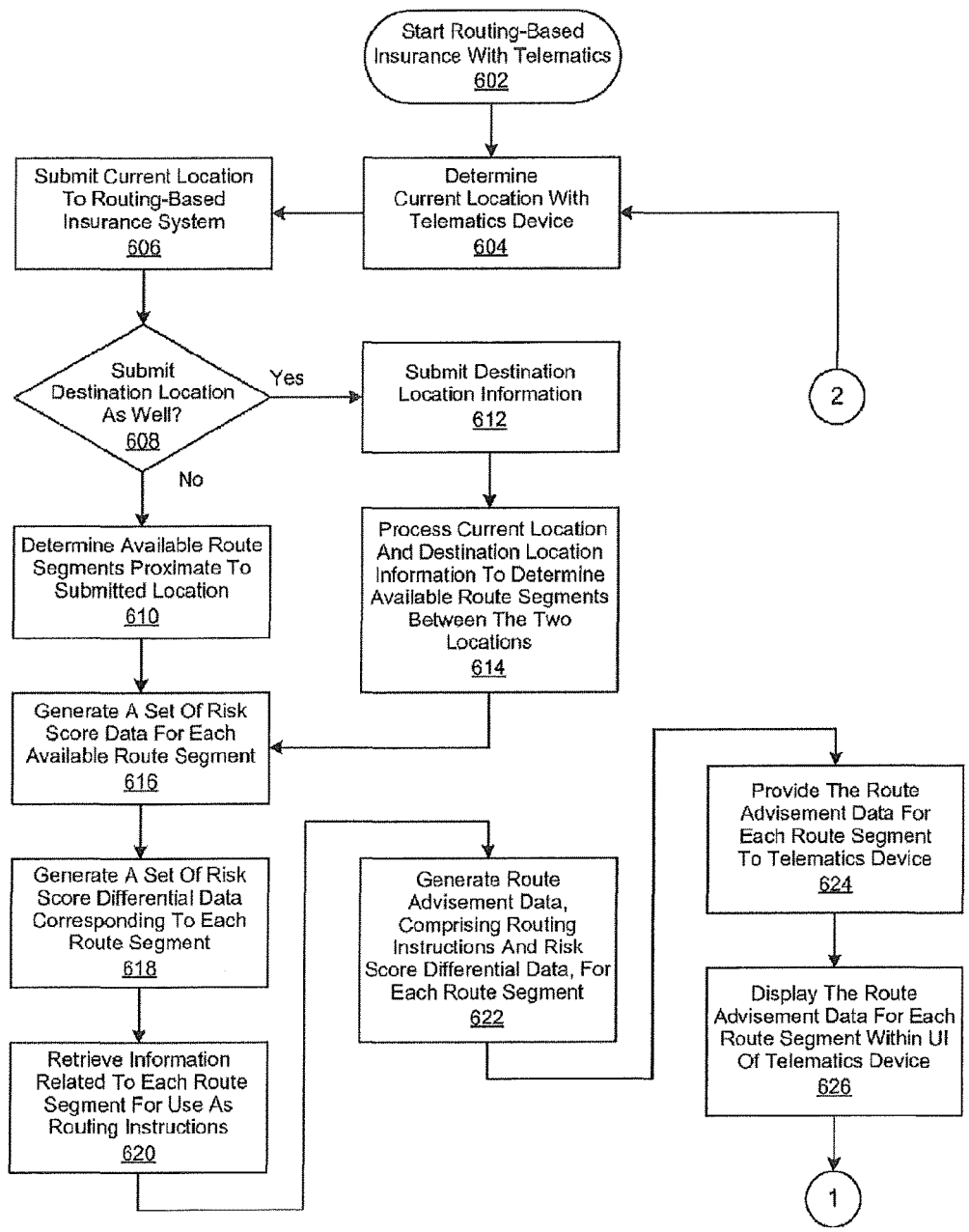
FIGS. 6A and 6B are a generalized flowchart of the operation of a routing-based insurance system as implemented with a telematics system in accordance with an embodiment of the disclosure.
Figure 6B:
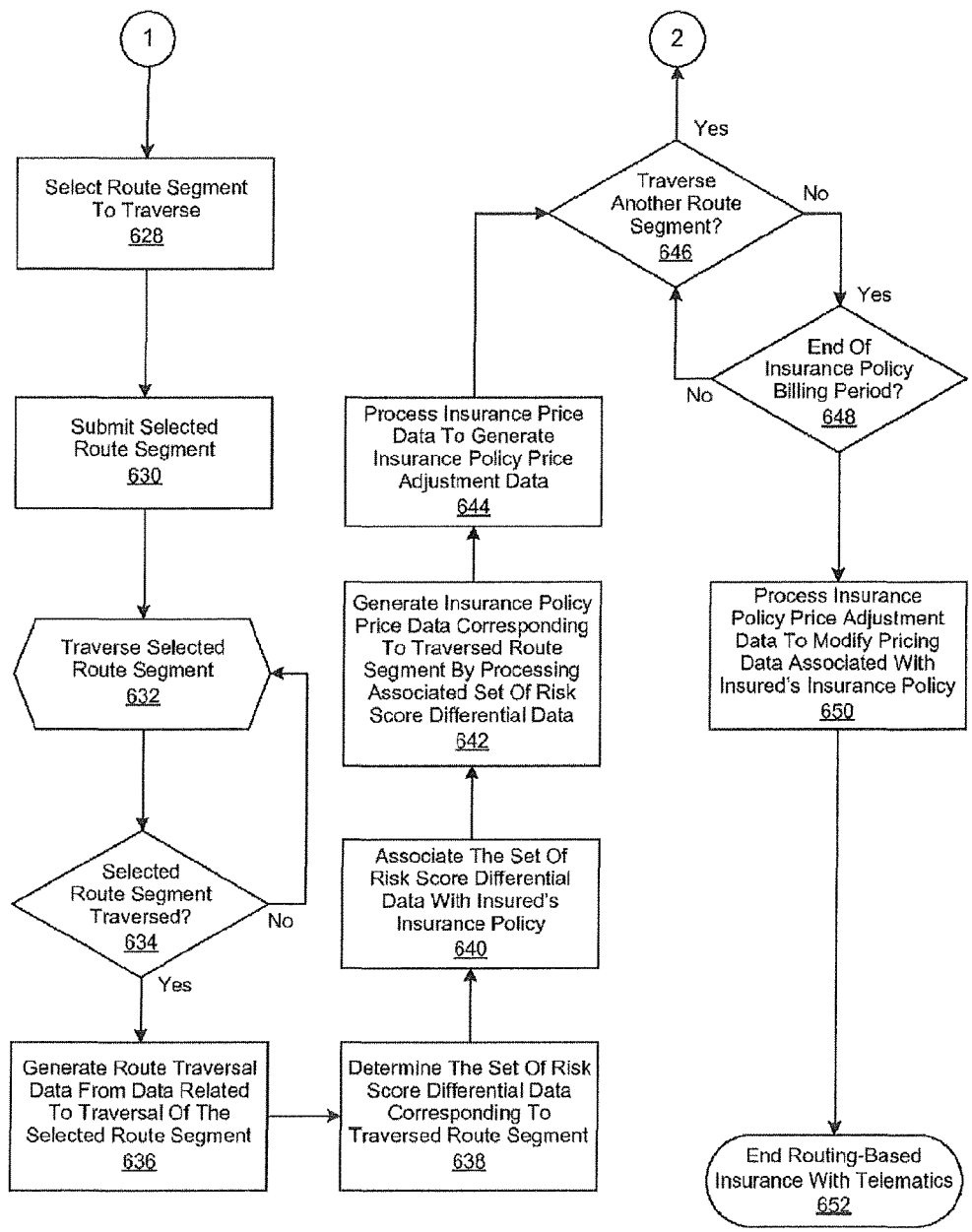

FIGS. 6A and 6B are a generalized flowchart of the operation of a routing-based insurance system as implemented with a telematics system in accordance with an embodiment of the disclosure. As used herein, telematics broadly refers to the integrated use of telecommunications and informatics. More specifically, telematics refers to the receiving, storing, processing and sending of information via telecommunication devices. As likewise used herein, a device used in a telematics system may comprise a laptop computer, a tablet computer, a personal digital assistant (PDA), a mobile telephone, or any device operable to receive, process, store, and transmit information. Likewise, a telematics system device may also comprise a navigation device or a geographic positioning system (GPS). Skilled practitioners of the art will be aware that the use of telematics has more recently been related to the integration of GPS technology with computers and mobile communications technology in automotive navigation systems. When used in such systems, telematics is more commonly referred to as vehicle telematics. One application of vehicle telematics is to monitor the location and movement of a vehicle. This monitoring is commonly achieved through a combination of a GPS receiver and a transmitting device, such as a Global System for Mobile communication (GSM) General Packet Radio Service (GPRS) modem or a Short Message Service (SMS) transmitter.

In various embodiments, a telematics device exchanges information in near real-time, or non-real-time, directly or indirectly, through one or more networks and intermediary devices, with a routing-based insurance system. In these and other embodiments, a vehicle may comprise any method of transportation, including but not limited to, an automobile, a motorcycle, a bicycle, an aircraft, or an aquatic vessel. In one embodiment, the telematics device is not implemented with a vehicle. Instead, the telematics device is implemented for use by a user traversing a route on foot. In this embodiment, the movement of the user along a route is monitored by the telematics device. Data related to the user's traversal of the route is then provided by the telematics device to the routing-based insurance system.

Referring now to FIG. 6, routing-based insurance operations using a telematics device are begun in block 602, followed by the telematics device determining the current location of an insured of a routing-based insurance policy in block 604. In one embodiment, the current location is determined by using GPS technology implemented in a vehicle navigation system. In another embodiment, the current location is automatically determined by the telematics device. In yet another embodiment, the current location is provided to the telematics device by a user. The current location of the insured is then submitted to the routing-based insurance system in block 606.

A determination is then made in block 608 whether a destination location is submitted by the insured as well. As an example, the user may know their destination in advance. If so, then the destination location is submitted to the routing-based insurance system in block 612. The routing-based insurance system then processes information related to the current location and the destination location in block 614 to determine available route segments between the two locations. In one embodiment, the information related to the current location and the destination location is stored in a repository of route-related data. However, if it is determined in block 608 that a destination location is not provided by the user, then available route segments proximate to the current location are determined in block 610. As an example, a user may not have a specific destination in mind. If that is the case, then available route segments originating from the current location are determined. However, if a destination location has been provided, then route segments, individually or in combination, that provide one or more routes between the two locations are determined.

Once the route segments have been determined in either block 610 or block 614, a set of risk score data is generated for each of the available route segments in block 616. In various embodiments, the set of risk score data is generated from a plurality of risk factor data associated with each route segment. As used herein, risk factor data refers to data that can be used to characterize one or more risk factors for a route segment. As an example, one risk factor may be crime statistics for an area traversed by the route segment. As another example, historical accident rates for the route segment may provide a risk factor. Other examples include road surface conditions, inclement weather, visibility, construction activities, traffic conditions, or pending natural disasters. It will be apparent to those of skill in the art that many such risk factors are possible and the foregoing are not intended to limit the spirit, scope, or intent of the disclosure. In one embodiment, the risk factor data related to a route segment is stored in a repository of route risk factor data. In one embodiment, the set of risk factor score data is generated by a route assessment module.

In block 618, a set of risk score differential data is generated for each of the route segments. In one embodiment, the risk score differential data is generated by a route assessment module performing comparison operations between a first set of risk score data and a second set of risk score data. As an example, sets of risk score data for five route segments are compared. One set of risk score data may be highest, another lowest, and the remaining three between the highest and the lowest. The respective sets of risk score data are then processed to generate a set of risk score differential data for each route segment, characterized as a numerical value. For example, a numerical value (e.g., '5') may be assigned to the route segment having the highest set of risk score data and another numerical value (e.g., '1'), may be assigned to the route segment having the lowest set of risk score data. The remaining three route segments may have numerical values of '2,' '2,' and '4,' corresponding to the proportion of their respective sets of risk score data to the highest and lowest sets of risk score data. In this example, the numerical value of one risk factor is lowest, one is highest, two are next to lowest, one is next to highest, and none are halfway between lowest and highest.

As another example, the numeric value for a set of risk score data for an exemplary route segment of 'moderate' risk may be a '3.' In contrast, the numeric value of a set of risk score data for a target route segment may be a '5,' indicating that it is a 'high' risk route segment. The comparison operations between the two route segments results in the generation of risk score differential data with a value of '+2,' signifying the target route segment represents a higher amount of risk than the exemplary, 'moderate' risk, route segment. It will be apparent to skilled practitioners of the art that many such approaches to the generation of sets of risk score data, risk score differential data, and their corresponding numeric values are possible and the foregoing are not intended to limit the spirit, scope or intent of the disclosure.

Information related to each route segment is then retrieved for use as routing instructions in block 620. For example, the routing instructions may include information associated with a map. In one embodiment, the information related to each route segment is stored in a repository of route-related data. Route advisement data, comprising the routing instructions and the set of risk score differential data for the route segment, is generated in block 622. In one embodiment, the route advisement data is generated by a route advisement module of the routing-based insurance system. The route advisement data is then provided to the telematics device in block 624, where it is displayed in block 626 within the user interface (UI) of the telematics device. Once displayed, a route segment is selected in block 628 to traverse, followed by the submission of the selected route segment by the telematics system to the routing-based insurance system in block 630.

The selected route segment is then traversed in block 632, followed by a determination in block 634 whether the selected route segment has been traversed. If not, the process continues, proceeding with block 632. Otherwise, route traversal data is generated from data related to the traversal of the selected route segment in block 636. In one embodiment, the route traversal data is generated from data related to the traversal of the selected route segment by a route tracking module of the routing-based insurance system. The set of risk score differential data associated with the traversed route segment is determined in block 638, followed by its association with the insured's insurance policy in block 640.

In block 642, insurance policy price data, corresponding to the traversed route segment, is generated by processing the route segment's associated set of risk score differential data. In block 644, the route traversal data and the insurance policy price data associated with the traversed route segment is processed to generate insurance policy adjustment data. In one embodiment, the insurance policy price data and the insurance policy adjustment data is generated by an insurance policy pricing module of the routing-based insurance system. A determination is then made in block 646 whether to traverse another route segment. If so, then the process continues, proceeding with block 604. Otherwise, a determination is made in block 648 if an insurance policy price adjustment is available. If not, then the process continues, proceeding with block 646. Otherwise, the insurance policy price adjustment data is processed in block 650 to modify pricing data associated with the insured's insurance policy. In one embodiment, the insurance policy price adjustment data is processed by an insurance policy pricing module of the routing-based insurance system to modify pricing data associated with the insured's insurance policy. Routing-based insurance operations using a telematics device are then ended in block 652.

Figure 7:
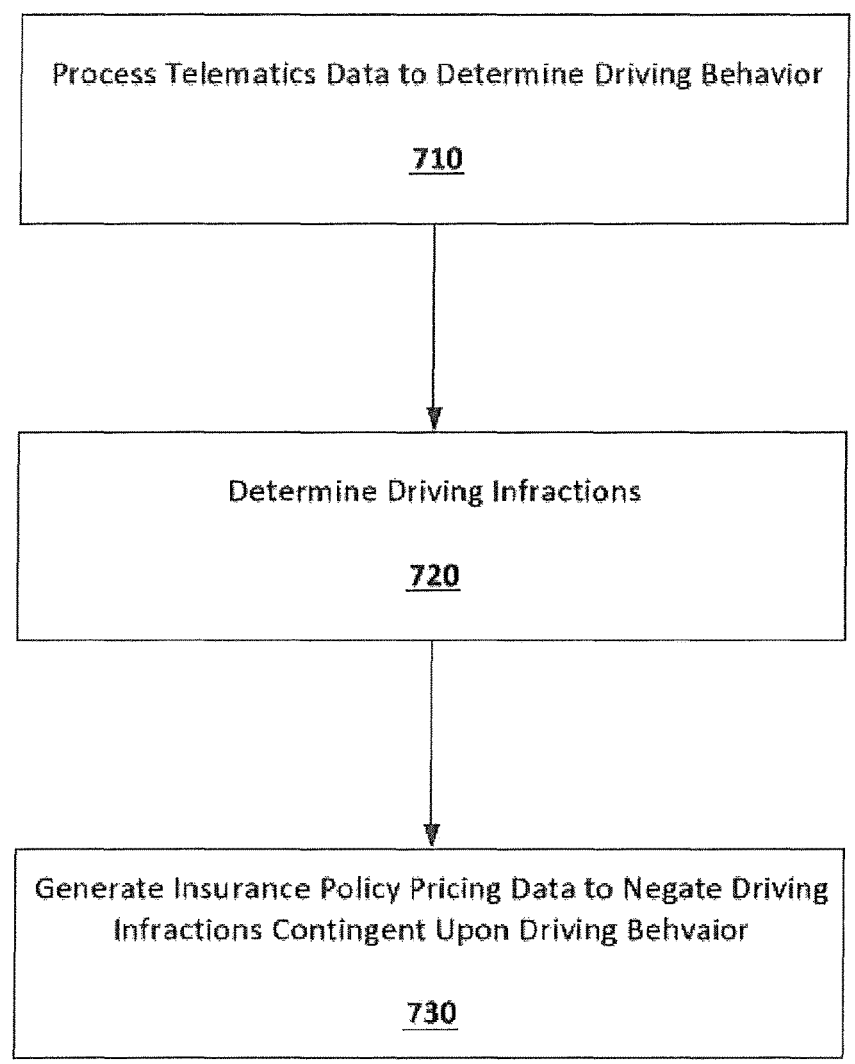
FIGS. 7-10 are generalized flowcharts of operation of a routing-based insurance system as implemented with a telematics system in accordance with additional embodiments of the disclosure.

With certain illustrated embodiments described above, discussion will turn to additional illustrated embodiments using telematics and routing-base insurance operations to facilitate pricing adjustments to an insured's policy. Starting with FIG. 7, described is a system and method which generally provides accident and/or conviction forgiveness if an insured demonstrates good driving behavior as determined by recorded telematics data. Starting at block 710, telematics data recorded via a telematics device 204 and transmitted to insurance policy management system 248 is processed to determine the driving behavior of an insured. It is to be appreciated, the determined driving behavior as described herein includes use of telematics data associated with the insured, including, but not limited to, the aforesaid determined risk factor, the insured's age, geography associated with the insured, routes determined traversed by the insured (as described above), and insured's credit based insurance score, an insured's driving record, performance parameters of an insured's vehicle (e.g., maximum speed traveled, average speed traveled, braking and acceleration parameters, vehicle maintenance, and the like), etc. Next, at block 720, driving infractions associated with an insured are identified. Driving infractions are reported incidents associated with an insured which consequently may increase a risk factor associated with the insured, including, but not limited to, one or more vehicular accidents associated with the insured and/or one or more traffic violations associated with the insured. Next, at block 730, insurance policy management system 248 is configured and operable to modify negative insurance policy effects caused by an insured's aforesaid associated driving infractions in view of the insured's aforesaid determined driving behavior. Thus, based on a degree an insured's driving behavior is determined good, any price increases caused by, or to be caused by, an insured's aforesaid associated driving infractions may be mitigated, which may include permanently, or temporarily (based on an insured's continuing driving behavior) removed from consideration when determining pricing for an insured's insurance policy. Therefore, the above provides financial incentive for an insured to achieve good driving behavior.

Figure 8:
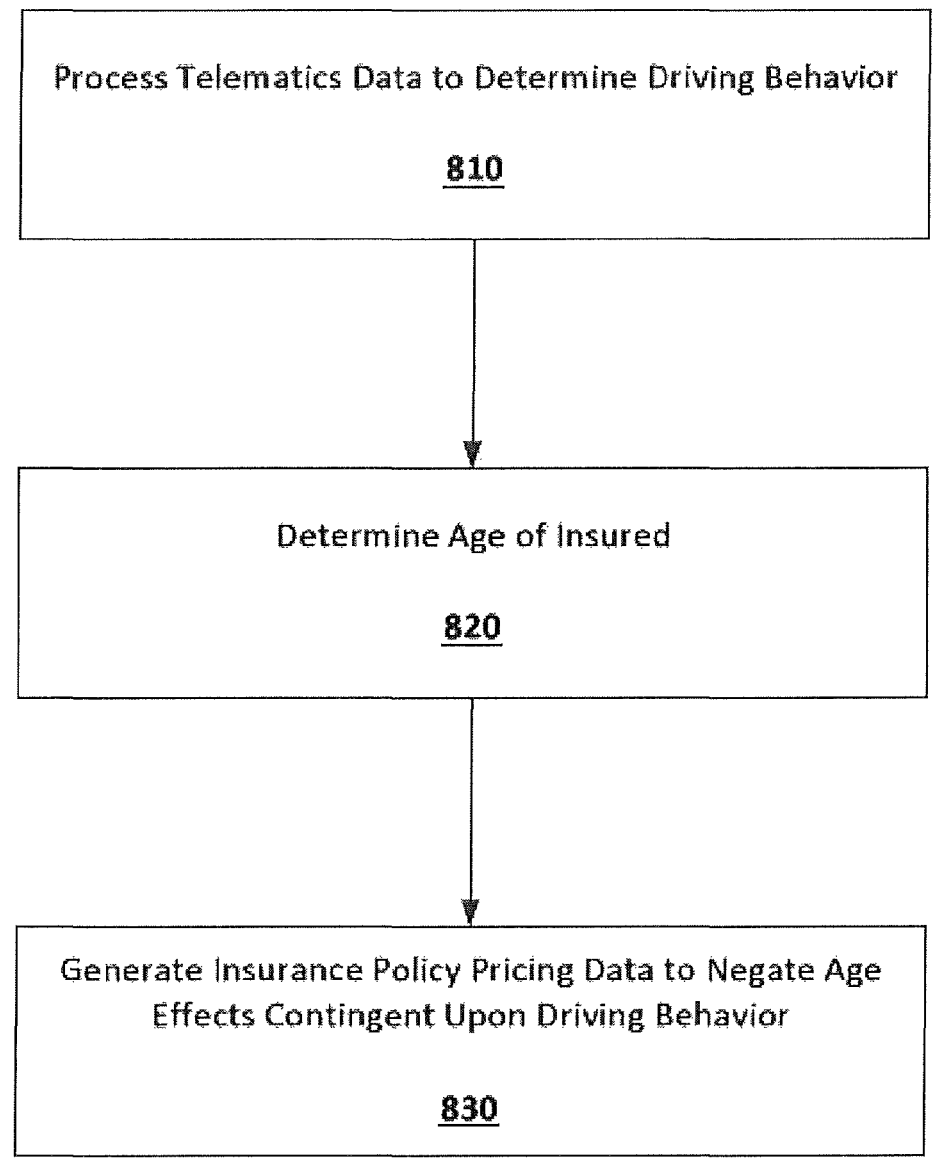

Turning now to the illustrated embodiment of FIG. 8, described is a system and method which generally provides an age factor for a preferable mature adult to be suspended contingent upon determined, and continuing, good driving behavior. Starting at block 810, telematics data recorded via a telematics device 204 and transmitted to insurance policy management system 248 is processed to determine the driving behavior of an insured. Next at block 820 the age of the insured is determined. Next, at block 830, insurance policy management system 248 is configured and operable to modify negative insurance policy effects caused by an insured's age in view of the insured's aforesaid determined driving behavior. Thus, any negative policy pricing effects caused by an insured's increasing age is either suspended or otherwise mitigated by the insured's determined good driving behavior.

Figure 9:
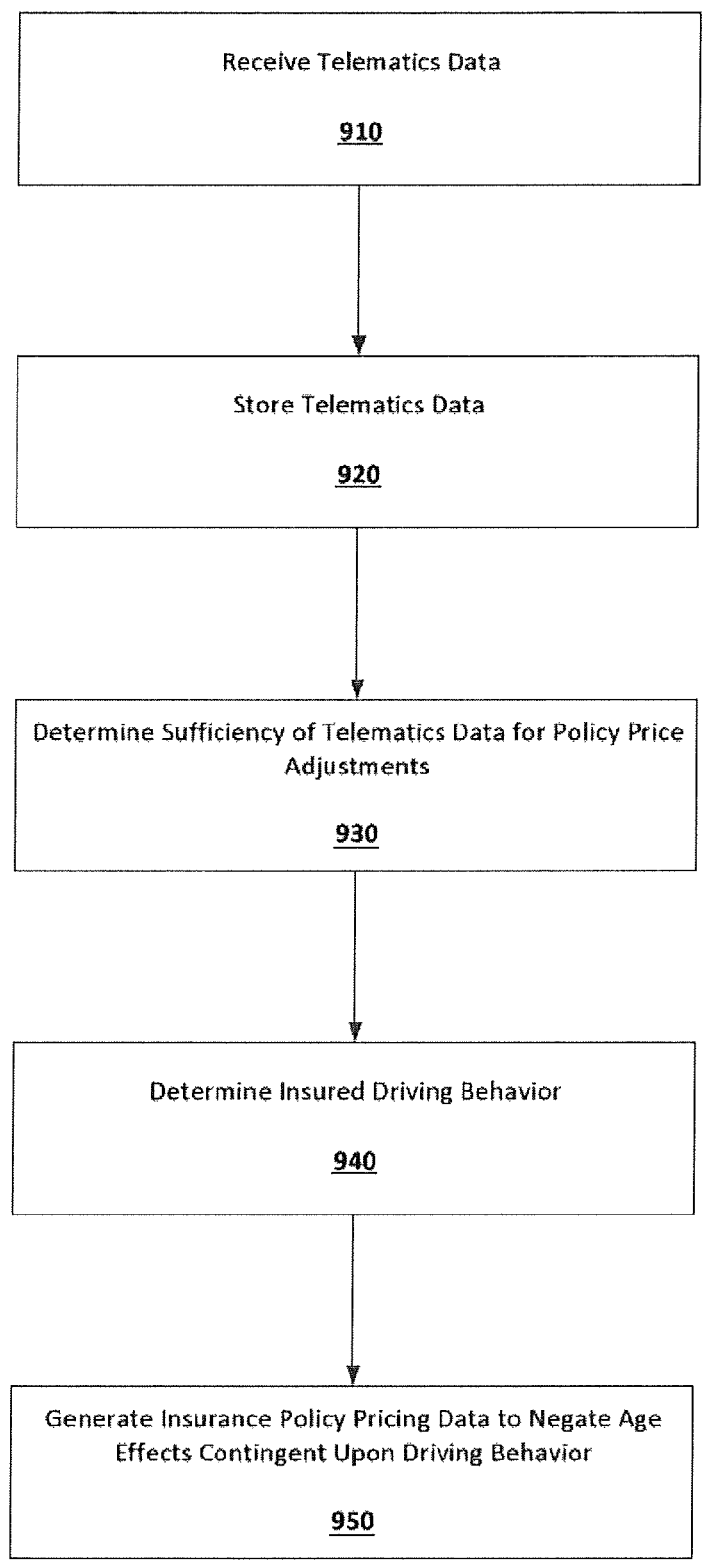

With reference now to the illustrated embodiment of FIG. 9, and starting at block 910, and as described above, telematics data is recorded by telematics device 204 and subsequently transmitted to Insurance Policy Management System 248 (block 920). Insurance Policy Management System 248 is then configured and operable to determine when a sufficient amount of telematics data is received from a telematics device 204 to justify generating insurance policy data to modify an insured's policy pricing based upon a determined driving behavior for the insured using the aforesaid received telematics data (block 930). It is to be appreciated factors used to determine when a sufficient amount of telematics data is received from a telematics device 204, includes (but is not limited to) a determined consistency of an insured's driving behavior and/or a determined distance travelled by the insured, which may, or may not, be limited to a prescribed time period.

Next at block 940, telematics data recorded via a telematics device 204 and transmitted to insurance policy management system 248 is processed to determine the driving behavior of an insured. Next, at block 950, insurance policy management system 248 generates insurance policy data to modify pricing for an insured's policy contingent upon the insured's aforesaid determined driving behavior and contingent upon a sufficient amount of telematics data is received from a telematics device 204 (via block 930). Thus, the aforesaid embodiment illustrated in FIG. 9 preferably provides a dynamic algorithm which determines how much vehicle telematics data is needed, preferably for each insured's vehicle, before utilizing a risk factor score to adjust policy pricing. The algorithm is preferably based on each individual vehicle's telematics data as associated with an insurance policy.

Figure 10:
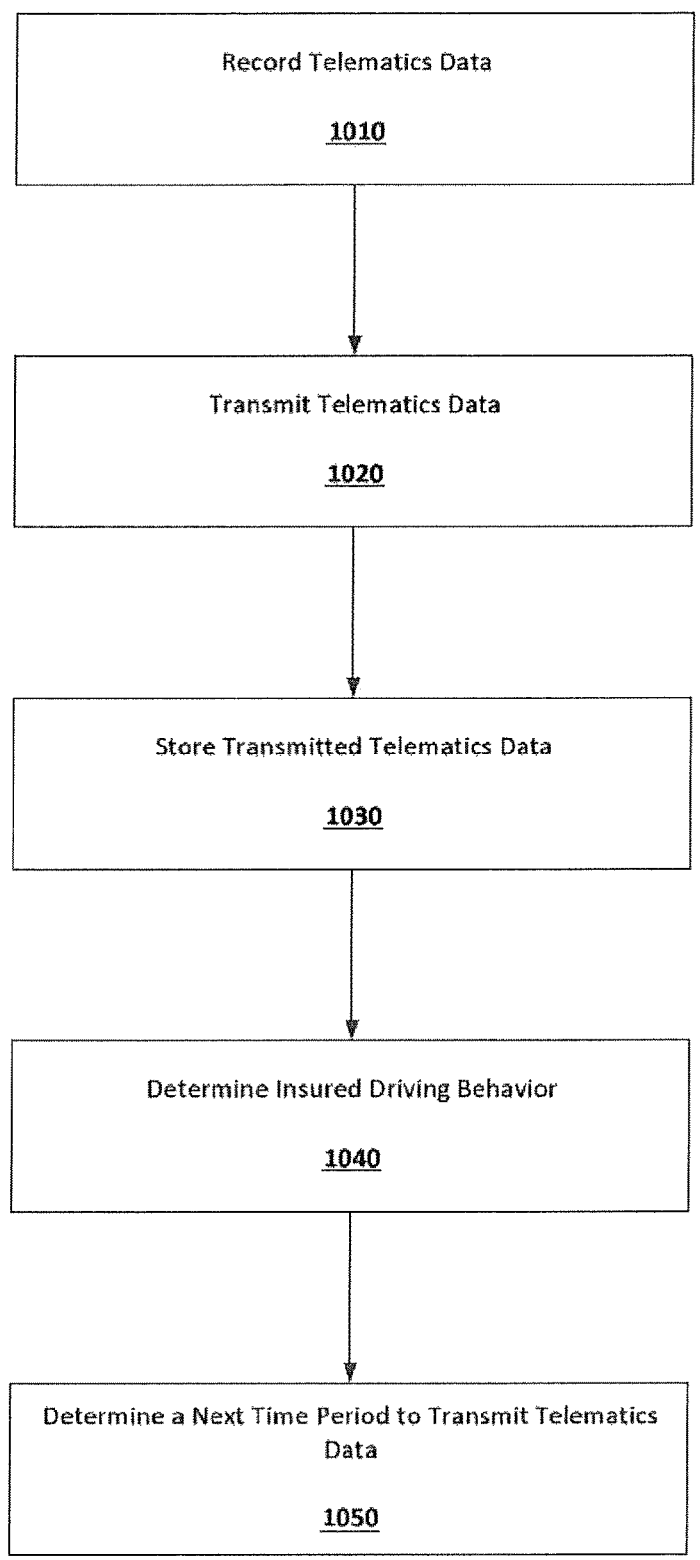

And with reference now to the illustrated embodiment of FIG. 10, and starting at block 1010, telematics data for an insured is recorded in a telematics device 204. Next in block 1020, preferably at an initial time period, the recorded telematics data is transmitted to preferably the Insurance Policy Management System 248 for storage in memory therein (block 1030). The Insurance Policy Management System 248 then preferably determines a driving behavior for the insured based upon the received telematics data, block 1040. At block 1050, the Insurance Policy Management System 248 is configured and operable to then determine a subsequent time period for when the telematics device 204 is to transmit recorded telematics data preferably based upon variables including (but not limited to) driver age, driver geography, credit based insurance score, driving infractions associated with the insured (as well as changes to those variables over time). Thus, between intervals of transmission of recorded telematics data, an insured does not utilize telematics device 204, which is advantageous for significantly reducing the requirement (and cost associated with) wirelessly connecting telematics device 204 to the Insurance Policy Management System 248.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanent, removable or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment.

Furthermore, other embodiments may expand on the referenced embodiment to extend the scale and reach of the system's implementation. The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed:

1. A method comprising:
   determining, by a telematics device of a vehicle, traversal, by the vehicle, of a route, wherein the telematics device is configured to:
      monitor a location of the vehicle; and
      generate data associated with the traversal, by the vehicle, of the route;
   receiving, by a computing device and from the telematics device, the data, wherein the data is stored to a memory;
   determining, based at least on the data and a determination that the data stored to the memory has reached a predetermined amount of data, driving behavior associated with the vehicle;
   determining, based at least on the driving behavior, a rating associated with the traversal, by the vehicle, of the route; and
   transmitting an indication of the rating.

2. The method of claim 1, wherein the route is one of a plurality of routes generated by the telematics device and selected, via a user interface of the telematics device.

3. The method of claim 1, wherein the determining the rating is further based at least on a risk score of the route.

4. The method of claim 1, wherein the telematics device comprises a global system for mobile communication (GSM) device.

5. The method of claim 1, wherein the determining the rating is further based at least on a performance parameter of the vehicle.

6. The method of claim 1, wherein the rating is associated with insuring the vehicle.

7. The method of claim 1, further comprising:
   determining traversal, by the vehicle, of another route;
   determining, based at least on data from the telematics device associated with the traversal of the vehicle of the another route, driving behavior associated with the vehicle and the another route; and
   determining, based at least on the driving behavior and the driving behavior associated with the another route, an average rating associated with the vehicle.

8. A non-transitory computer-readable medium comprising computer-readable instructions for:
   receiving, from a telematics device of a vehicle, data generated by the telematics device, wherein the telematics device is configured to monitor movement of the vehicle, and wherein the data is associated with movement of the vehicle and is stored to a memory;
   determining, based at least on the data and a determination that the data stored to the memory has reached a predetermined amount of data, driving behavior associated with the vehicle;
   determining, based at least on the driving behavior, a rating associated with the vehicle; and
   transmitting an indication of the rating.

9. The non-transitory computer-readable medium of claim 8, wherein the predetermined amount of data is based at least on a sufficient sample size of data to determine the rating associated with the vehicle.

10. The non-transitory computer-readable medium of claim 8, wherein the predetermined amount of data corresponds to a time period associated with the stored data.

11. The non-transitory computer-readable medium of claim 8, wherein the data is received via at least one of a wireless connection, a physical connection, or an intermediary device.

12. The non-transitory computer-readable medium of claim 8, wherein the data comprises data associated with one or more periods of time; and
   wherein the determining the rating associated with the vehicle comprises determining the rating at time intervals, wherein each of the time intervals corresponds to at least one of the one or more periods of time.

13. An apparatus comprising:
   a processor; and
   a memory coupled with the processor, the memory storing executable instructions that when executed by the processor cause the processor to effectuate operations comprising:
      generating, based at least on a destination of a vehicle, a plurality of routes to the destination, wherein each of the plurality of routes comprises one or more route segments;
      determining, based at least on the one or more route segments, a risk score for each of the plurality of routes;
      monitoring, by a telematics device of the vehicle, the vehicle on a selected route of the plurality of routes;
      determining, based at least on the risk score of the selected route and the monitoring the vehicle on the selected route, a rating associated with traversal, by the vehicle, of the selected route; and
      transmitting an indication of the rating.

14. The apparatus of claim 13, wherein the rating comprises a risk score of the traversal, by the vehicle, of the selected route.

15. The apparatus of claim 13, further operations comprising causing output, via a user interface of the telematics device, of an indication of the plurality of routes, wherein an indication of the selected route is received, via the user interface of the telematics device.

16. The apparatus of claim 13, wherein the determining the risk score for each of the plurality of routes is further based at least on at least one of a crime statistic, an accident rate, a road condition, a weather condition, a construction activity, or a traffic condition of an area traversed by at least one of the plurality of routes.

17. The apparatus of claim 13, further operations comprising determining the selected route of the plurality of routes based at least on the risk score for each of the plurality of routes.

18. The apparatus of claim 13, further operations comprising determining, based at least on the rating, information associated with insuring the vehicle.

19. The apparatus of claim 13, wherein the determining the rating is further based at least on a characteristic of an operator of the vehicle.

* * * * *